Jan. 18, 1944.                C. H. LARSON                2,339,276
                        PROTECTOR FOR THERMOSTATS
                          Filed April 10, 1941
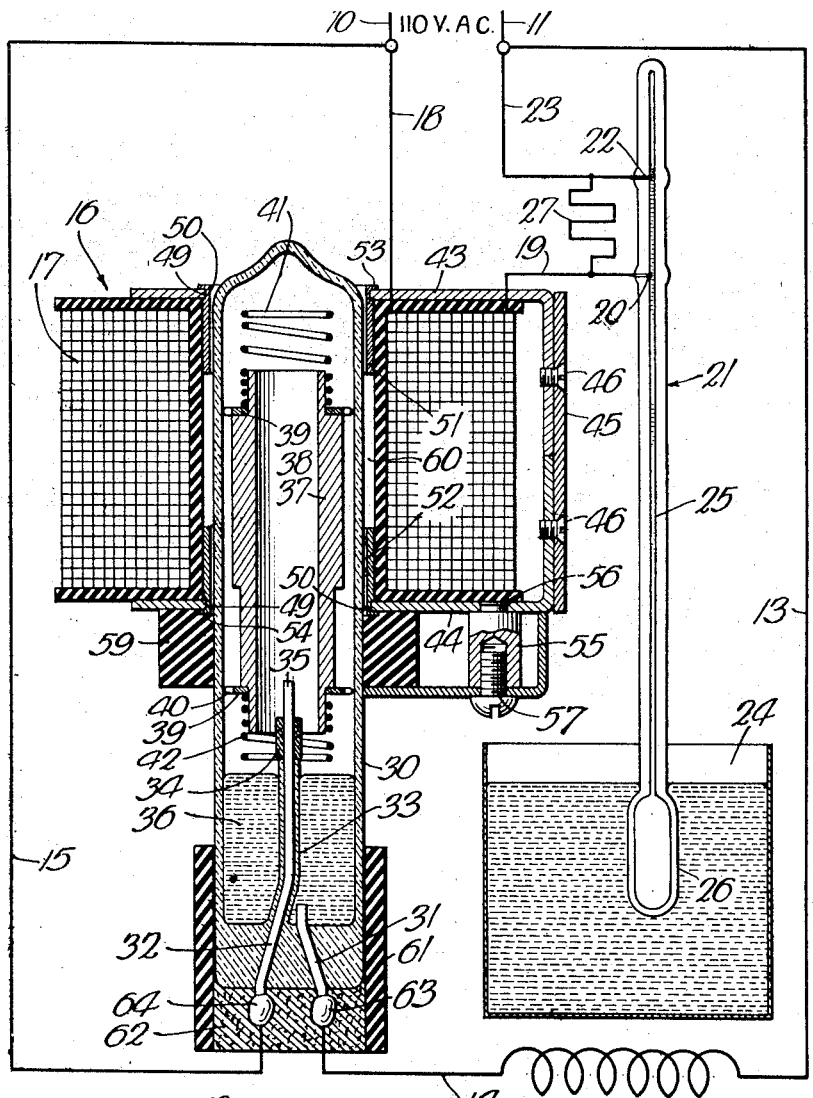
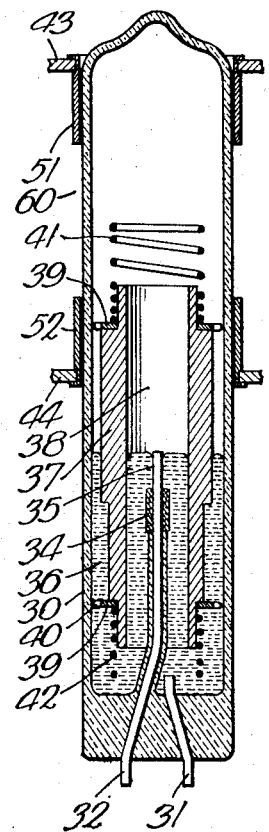
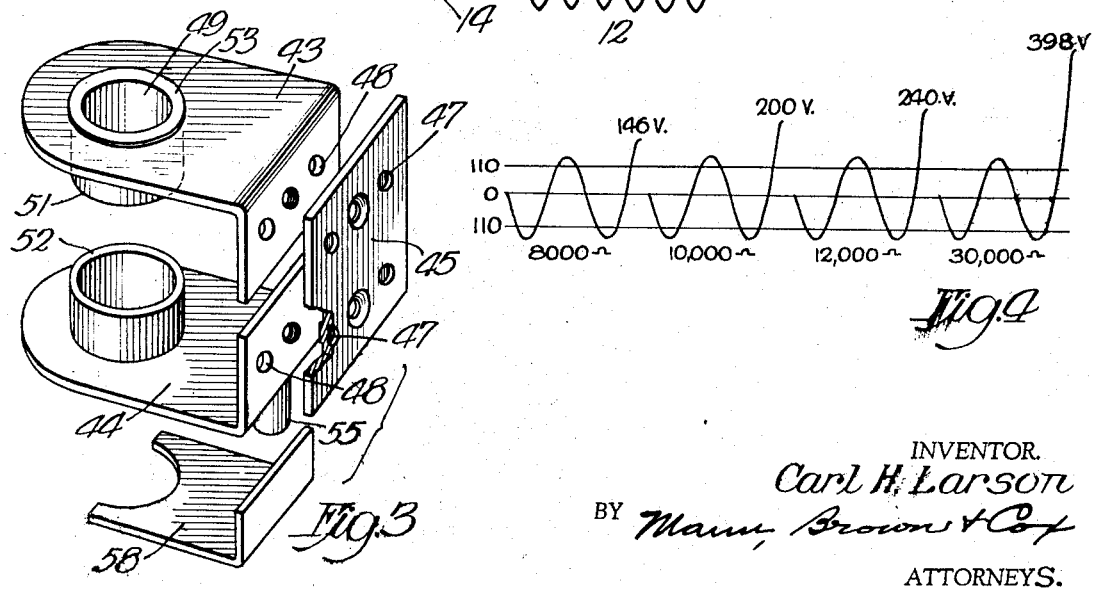
INVENTOR.
Carl H. Larson
BY Mann, Brown & Cox
ATTORNEYS.

Patented Jan. 18, 1944

2,339,276

UNITED STATES PATENT OFFICE 2,339,276

PROTECTOR FOR THERMOSTATS

Carl H. Larson, Elkhart, Ind., assignor to The Adlake Company, a corporation of Illinois Application April 10, 1941, Serial No. 387,879

6 Claims. (Cl. 175—294)

The principal object of this invention is to provide a relay circuit for thermostatic controls that will protect the thermostat from high transient or induced voltage impressed across its contacts when the circuit is broken. Generally speaking, this is accomplished by connecting a resistor across the contacts of the thermostat in shunt with the thermostat and having sufficient resistance to prevent the controlling relay from picking up on open circuit and to provide a relatively low resistance path for the discharge and dissipation of the high voltage that is induced by separating the contacts of the thermostat.

Further objects and advantages of the invention will be apparent from reading the description in connection with the accompanying drawing showing selected embodiments sufficient to illustrate the application of the invention, and in which Fig. 1 includes a channel arrangement for a thermo-regulated heating circuit in diagram with the mercury switch shown in the position it assumes when the thermostat is closed;

Fig. 2 is a vertical section through the mercury switch showing the parts in their normally closed position, which they assume when the thermostat opens;

Fig. 3 is a perspective view of elements forming the iron circuit and associated parts slidingly displaced from their assembled position, and Fig. 4 is an oscillographic record of the amplitude of induced voltage with selected dampening resistances ranging from 8,000 ohms to 30,000 ohms.

But these specific arrangements are used for the purpose of disclosure only and are not intended to impose unnecessary limitations on the claims.

In Fig. 1 a source of power, for example 110 A. C. current, is indicated by the line 10—11. The load 12 is connected across the line by wires 13, 14 and 15, between the latter two of which is connected the controlling relay 16. That relay includes a coil or winding 17 connected at one end with the line wire 10 by wire 18 and at the other end by wire 19 with one electrode 20 of a thermostatic switch 21, the other electrode 22 of which is connected by the wire 23 with the other side 11 of the line.

The purpose of the thermostat is to operate the relay 16 when the temperature to be controlled reaches a selected degree, and the purpose of the relay 16 is to connect the load 12 with the line or disconnect it from the line as the case may be.

The thermostat here illustrated is of the mercury type, made by sealing metal electrodes into the tube of a familiar type of mercury thermometer, although other types of thermostat may be used, among which may be mentioned those in which the contacts are from mercury to mercury, as shown in Philadelphia Thermometer Company's catalogue No. 104, pages 3, 4 and 5.

The invention is particularly applicable to circuit closers having contacts of inherently low current carrying capacities.

The controlling relay 16, selected for illustration, is of the mercury plunger type, normally closed. This type is particularly suited to use in atmospheres containing inflammables and such like, because the making and breaking of the circuit is entirely within a sealed envelope. In this illustration, the normally closed type of relay is used because it is suited to the control of a load consisting of a heating unit for a bath or chamber 24, whose temperature is to be maintained and regulated at a selected degree. When applied to a chamber or bath to be maintained at temperatures below normal a normally open type of relay will be used and the load will take the form of the necessary refrigeration equipment.

The thermostat

Thermostats of the type here illustrated are made very much like small thermometers and are necessarily fragile and subject to damage or destruction, either by overload or high voltage. Those of present make cannot ordinarily carry more than one hundred milliamperes without being severely damaged. The bore 25 of the glass tube of such a thermostat frequently does not exceed four one-thousandths (.004) of an inch in diameter, and the contacts 20 and 22 are often not more than two one-thousandths (.002) of an inch in diameter and composed of platinum sealed into the glass tube and projecting into the capillary bore 25. From this it will appear that approximately one-half the diameter of the capillary bore is taken up by the metal contacts. Hence, the clearance is very small and any arcing immediately affects the glass. As a rule, the lower end of the thermo-regulator has its bulb 26 located in the compartment or substance whose temperature is to be controlled. The space above the mercury is ordinarily filled with hydrogen under pressure of about one hundred twenty-five (125) pounds.

The control relay

Electro-mechanical relays which consume 1 to 2 milliamperes of 110 A. C. 60 cycle current may be had and relays of that type may be used without departing from the spirit of the invention if the conditions are suitable. However, as a rule, it will be preferable to use a mercury switch plunger type relay drawing possibly 12 to 16 milliamperes at 110 A. C. 60 cycle, such as, for example, No. 1045, made by the Adams & Westlake Company, Elkhart, Indiana. The coil or winding 17, shown in this illustration, has 13,800 turns of number 35 enamel wire, a resistance of 1800 ohms, and a total impedance of coil and iron circuit of approximately 9,000 ohms.

With such a relay, coil or winding, when the circuit is opened by the thermostat a high voltage transient or induced current is impressed across its contacts in excess of 1,000 volts at the moment of break when that occurs at or near the peak of the phase. From this it will appear that arcing at the contacts in the thermostat is bound to be severe and in a mercury type thermostat the effect is to damage the glass tube and the metal contacts, if any, and thus limit the useful life of the device. It has been observed in a thermostat of the type shown that very few operations result in silvering the interior of the capillary bore and rapidly reducing the clearance and sensitivity.

The mercury switch of the relay 16 includes a glass envelope 30 having lead-in wires 31 and 32 connected with wires 14 and 15 sealed in through the bottom of the envelope, the wire 32 projecting upward within the envelope through a glass sleeve 33 caped with a ceramic ring 34, leaving the upper end 35 bare to form an electrode for cooperation with the charge of mercury or mercury-fill 36. The ceramic ring 34 is sealed to the glass 33 and both are sealed to the wire 32.

Within the envelope 30 and cooperating with the mrecury 36 is a plunger 37 of suitable magnetic material such as one-half inch cold rolled steel rod. The plunger has an open center bore 38 to receive the electrode 35 and associated parts and its ends are reduced to receive guide rings 39 having anti-friction points 40 and held in place by the cushion springs 41 and 42 which frictionally engage the plunger.

It will avoid needless repetition to refer to the patent to Larson, No. 2,060,811 of November 17, 1936, for details as to the guide rings, cushion springs, etc.

The iron circuit includes top and bottom brackets 43 and 44 (Fig. 3) of 16 U. S. S. gauge soft cold drawn strip steel secured to a mounting plate 45 of similar material by means of screws 46 and studs 47, the latter projecting into sockets 48.

The top and bottom brackets 43 and 44 have aligned openings 49 to receive the reduced ends 50 of upper and lower pole sleeves 51 and 52, which are secured in place by peening, as indicated at 53 and 54 (Fig. 1).

The bottom bracket 44 has a spud 55 riveted to it at 56 and threaded to receive a screw 57 by which a retaining bracket 58 is secured to the bottom bracket 44. The purpose of the retaining bracket is to support a soft rubber ring 59 which frictionally engages the glass envelope 30 and supports the switch in appropriate position with respect to the air gap 60 between the pole sleeves 51 and 52.

The lower end of the envelope 30 is enclosed in a sleeve 61 of Bakelite, or such like condensate product, secured to it by cement 62, which also surrounds the soldered joints 63 and 64 by which the switch is connected to the wires 14 and 15.

The normally closed circuit position of the mercury switch is shown in Fig. 2, from which it will be seen that the mercury-fill 36 has closed the circuit with the electrode 35. When the coil 17 is energized above its pick-up value the plunger 37 rises to close the air gap 60 between the pole sleeves 51 and 52 and the mercury drops to the level indicated in Fig. 1, breaking the circuit between it and the electrode 35. When the coil 17 is deenergized below its drop away value the plunger drops and raises the mercury to the position shown in Fig. 2.

The breaking of the circuit at the thermostat is accompanied by the above mentioned induced voltage, which runs very high and, but for the provisions of this invention, causes excessive arcing between the contacts of the thermostat.

The resistor

It has been found that by inserting a resistance of suitable value in series with the coil 17 of the relay and in parallel with the thermostat, the contacts of that instrument are protected from arcing and its life is increased many hundred times. In the arrangement here illustrated, a resistance 27 of 8,000 ohms and 5 watts capacity and as nearly non-inductive as possible is suitable for the values given for the other parts of the apparatus. In any case, the resistance should be sufficient to enable the relay 16 to pick up and drop away when the thermostat contacts are closed and opened with the operating voltage at the selected maximum. The resistance should also be low enough to pass the induced high voltage current and arcing at the contacts.

With 8,000 ohms resistance at 27 in the illustrative arrangement, very little current will flow through the coil of the relay. Upon breaking the circuit, however, at the metal contact 22 in the thermostat the enormous induced voltage that will be impressed across the gap as a result of the break will discharge through the resistance 27 and be reduced to approximately 146 volts across the contacts, as shown by the oscillograph at the left of Fig. 4, which is below any harmful value.

In series to the right in Fig. 4 are shown oscillographs with 10,000, 12,000 and 30,000 ohms resistance at 27, and, as shown, the induced voltage is reduced to 200, 240 and 398 volts, respectively.

Operation

The control relay 16 here illustrated, is normally closed whereby the mercury and the electrode 35 close the circuit through the load 12. The coil or winding 17 of the relay 16 is connected across the line but, due to the protecting resistance 27, there is not sufficient current through the winding to make the plunger 37 rise or, in other words, to make the relay pick up, even though the voltage is abnormally high, say 140 volts. However, when the mercury in the thermostat 21 closes with the electrode 22, a shunt circuit is formed across the resistance 27 and then there is sufficient flow through the winding 17 to make the relay pick up and open the circuit through the load 12. As long as the thermostat is closed at 22 this condition will be maintained. But when the change of temperature opens the thermostat at 22 the coil 17 is effectively deenergized, the plunger 37 falls, the mercury rises and closes the circuit through the load by contact with the electrode 35. At the instant the mercury in the thermostat 21 breaks with the electrode 22, high voltage is induced in the circuit through the winding 17 (except when the phase is zero) but it is relieved through the resistance 27 without causing a damaging arc as the thermostat opens.

The operation is very similar when arranged to effect cooling instead of heating, as indicated in this diagram. Similar operation would take place if the thermostat was replaced by a humidostat, or some other circuit closing device responding to conditions sought to be controlled, and the claims should be read accordingly.

In one way of looking at the arrangement, the circuit through the relay coil 17 is always closed but the resistance in the resistor 27 is so great as to prevent a pick up at the selected maximum voltage on the line. The thermostat, hydrostat, or other circuit closer, being in parallel with, or in shunt across the resistor when it closes, the total resistance is sufficiently reduced to permit current of pick up value to flow through the coil 17, but when the circuit closer opens, the induced voltage which would otherwise cause damaging arcing, discharges through the resistor 27 and is reduced to a harmless value.

I claim:

1. A temperature responsive control apparatus, comprising an armature acted upon by a force tending to move it to one position, a solenoid for moving the armature to a second position, a thermostatic switch, a source of alternating current, the solenoid and the switch being connected in series with each other and across the source of alternating current, and a resistor connected across the switch, the resistor having enough resistance so that the current which flows through it when the switch is open is too weak to hold the armature in its second position.

2. A temperature responsive control apparatus, comprising a relay having an armature acted upon by a force tending to move it to one position and a solenoid for moving it to a second position, a source of alternating current, a resistor, the resistor and the solenoid being connected in series with each other and across the source of alternating current, and a mercury thermometer having a pair of contacts connected to opposite ends of the resistor, the contacts projecting into the interior of the thermometer and being located so as to be electrically connected by the mercury in the thermometer when the thermometer reaches a predetermined temperature, and the resistor having enough resistance so that the current which flows through it and the solenoid, when the contacts of the mercury thermometer are open, is too weak to move the armature from the first position to the second position, or hold it in the latter position.

3. A control apparatus, comprising a relay having an armature acted upon by a force tending to move it to one position and a solenoid for moving it to a second position, a source of alternating current, a resistor, the resistor and the solenoid being connected in series with each other and across the source of alternating current, a capillary tube having a contact therein, a thread of mercury in the capillary tube, means to move the thread of mercury into and out of contact with the contact, and a second contact electrically connected to the thread of mercury, the two contacts being connected to opposite ends of the resistor, and the resistor having enough resistance so that the current which flows through it and the solenoid, when the capillary tube contacts are open, is too weak to move the armature from the first position to the second position, or hold it in the latter position.

4. A control apparatus, comprising a relay having an armature acted upon by force tending to move it to one position, and a solenoid for moving it to a second position, a source of alternating current, a resistor, the resistor and the solenoid being connected in series with each other and across the source of alternating current, and a switch having a pair of contacts connected across the resistor, the resistor having enough resistance so that the current which flows through it and the solenoid, when the switch contacts are open, is too weak to move the armature to, or hold the armature in, its second position.

5. A control apparatus comprising a relay having an armature acted upon by force tending to move it to one position, a solenoid for moving the armature to a second position, a switch having a pair of contacts, a source of alternating current, the solenoid and the switch being connected in series with each other and across the source of alternating current, and a resistor connected across the contacts of the switch, the resistor having enough resistance so that the current which flows through it, when the switch is open, is too weak to move the armature from the first position to the second position, or hold the armature in said latter position, said resistor also being of sufficiently low resistance and having non-inductive characteristics to effectively suppress the arcing across the contacts of the switch.

6. A control apparatus, comprising a relay having an armature acted upon by a force tending to move it to one position and a solenoid for moving it to a second position, a source of alternating current, a resistor, the resistor and the solenoid being connected in series with each other and across the source of alternating current, a capillary tube having a contact therein, a thread of mercury in the capillary tube, means to move the thread of mercury into and out of contact with the contact, and a second contact electrically connected to the thread of mercury, the two contacts being connected to opposite ends of the resistor, and the resistor having enough resistance so that the current which flows through it and the solenoid, when the capillary tube contacts are open, is too weak to move to or hold the armature in its second position, said resistor also being of sufficiently low resistance and having non-inductive characteristics to effectively suppress the arcing across the contacts in the capillary tube.

CARL H. LARSON.